United States Patent [19]

Simpson

[11] Patent Number: 4,726,978

[45] Date of Patent: Feb. 23, 1988

[54] CHARCOAL FABRIC NEEDLED TO SUPPORTING FABRICS

[75] Inventor: Keith Simpson, Newport, Wales

[73] Assignee: Siebe Gorman & Company Limited, Gwent, Wales

[21] Appl. No.: 922,087

[22] Filed: Oct. 22, 1986

[30] Foreign Application Priority Data

Oct. 23, 1985 [GB] United Kingdom ............... 8526119

[51] Int. Cl.$^4$ ............................................. B32B 5/02
[52] U.S. Cl. .................................... 428/198; 428/234; 428/235; 428/247; 428/253; 428/284; 428/300; 428/301; 428/408
[58] Field of Search ............... 428/198, 234, 235, 247, 428/253, 284, 300, 301, 408, 902

[56] References Cited

U.S. PATENT DOCUMENTS 4,250,172 2/1981 Mutzenberg ..................... 428/300

FOREIGN PATENT DOCUMENTS 0079808 5/1983 European Pat. Off. ............ 428/300

*Primary Examiner*—Marion C. McCamish
*Attorney, Agent, or Firm*—Kane, Dalsimer, Sullivan, Kurucz, Levy, Eisele and Richard

[57] ABSTRACT

A layer of a non-woven or open-woven or open-knitted charcoal cloth is supported on a layer of a textile material having fibers needle-punched through the charcoal cloth. This composite material can be incorporated in various multi-layer structures having, for example, a further textile layer and/or a microporous or similar layer on the other side of the charcoal cloth. Such multi-layer structures may be used in protective clothing, as filter materials or in medical dressings, or in the manufacture of moulded articles such as face masks.

23 Claims, No Drawings

CHARCOAL FABRIC NEEDLED TO SUPPORTING FABRICS

This invention relates to a composite material for use in making protective clothing affording protection in particular against chemical agents, especially toxic and/or offensive agents used for military purposes.

Composite materials according to the invention may also be used as filter materials, in bandages or other medical dressings, or in the manufacture of moulded articles such as face masks.

In British Patent Specification No, 1 173 142, it is proposed to apply an adhering coating comprising absorbent charcoal particles, especially activated carbon particles, to an air-permeable cloth material which may be a woven, non-woven, knitted or composite fabric. According to that proposal, the carbon particles may be bonded to the cloth material by, for example, a natural rubber latex bonding agent.

It has been found in practice that protective clothing made from material according to Specification No. 1,173,142 suffers from certain disadvantages. In particular, the use of a bonding agent such as rubber latex tends to mask the absorbent carbon and limit its effectiveness. Such clothing also tends to make the wearer too hot. Furthermore, the use of rubber latex tends to cause premature aging of the cloth material.

Attempts have also been made to laminate charcoal cloth between two supporting fabric layers using adhesives. It has been found, however, that although composite textile materials can be made in this way, virtually any applied stress will cause the charcoal cloth to disintegrate to form a fine dust. The result in a protective garment made from such material is serious or even total loss of protection, because the charcoal dust simply falls down between the inner and outer fabric layers.

It is an object of the invention to provide a method of incorporating charcoal cloth into protective fabrics in a satisfactory and durable manner.

It is a further object of the invention to provide a novel filter material which may be used, for example, in bandages or in other medical dressings, or may be moulded into articles of any desired shape, for example, surgical or industrial face masks.

The present invention provides a composite material comprising a layer of a non-woven or open-knitted or open-woven charcoal cloth supported on a layer of a textile material having fibres needle-punched through the charcoal cloth. In accordance with the invention, such a composite material may be incorporated in various multi-layer structures as described hereinafter.

In a first important form of multi-layer material according to the invention, the charcoal cloth is disposed between the said needle-punched textile layer and a further layer of a textile material. Advantageously, fibres of the said further textile layer are also needle-punched through the charcoal cloth. In general, fibres of the or each needle-punched textile layer are needle-punched so as to extend through the other textile layer as well as through the charcoal cloth.

Accordingly, in one embodiment, the present invention provides a composite material in which a layer of a non-woven or open-knitted or open-woven charcoal cloth is disposed between an inner and an outer supporting layer of textile materials, and in which fibres of at least one of the said supporting layers have been needle-punched through to the opposite side of the resulting multi-layered structure.

Advantageously, at least one textile layer is a non-woven material and, since such materials are especially suitable for needle-punching, it is preferable for the or at least one needle-punched textile layer to be a non-woven material.

The said further textile layer may also comprise a non-woven material, or may comprise any of a wide variety of knitted or woven textile materials. For many purposes, open scrim will be a suitable material for the said further textile layer.

In cases where both of the textile layers are non-woven, then either or both may be needle-punched.

The term "charcoal cloth" is used herein to denote a cloth material, preferably a cellulosic cloth, which has been subjected to carbonisation and activation processes in accordance, for example, with British Patent Specification No. 1 570 677.

It would have been expected that the severe process of needle-punching would damage the fragile charcoal cloth. Surprisingly, however, it has been found in practice that, especially in the case of an open-knitted or open-woven charcoal cloth there is little or no damage to the cloth. In a composite material according to the invention incorporating a textile layer on each side of the charcoal cloth, the needle-punching forces fibres of one or both of the inner and outer supporting layers through the charcoal cloth and, in general, also through to the opposite side of the composite material. The needle-punched fibres serve as a matrix to bind the charcoal cloth into position. With suitable density and depth of penetration of needle-punching, no adhesives are in general necessary to bond the layers (as distinct from any inherent adhesive properties of any of the layers), and composite materials according to the invention advantageously contain no adhesive material bonding the layers.

The reasons for the surprisingly low degree of damage caused to the charcoal cloth during needle-punching are not fully understood, but it is believed that the open-ness or porosity of a knitted or woven cloth is a significant factor. It will accordingly be appreciated that the mesh size and distribution in such charcoal cloths is important in determining the durability of the final needle-punched product. It has been found that good results can in general be obtained using a charcoal cloth, especially a knitted charcoal cloth, having a mesh size in the range of from 0.1 to 0.7 mm.

In the case of a non-woven charcoal cloth, the surprisingly low degree of damage caused by the needle-punching may suggest that a proportion of the randomly oriented fibres in the cloth can be broken without consequential disruption of the cloth structure elsewhere.

Other important factors affecting the durability of the product are the density of needle-punching and the size of the needles. For example, in the case of a knitted charcoal cloth (120 g/m$^2$) disposed between two layers of non-woven viscose (each 25 g/m$^2$), satisfactory results have been obtained at a density of 300 punches/inch on each side (with minimum needle penetration) to attach the viscose supporting webs to the knitted charcoal cloth. If, however, the resulting single-needled material is then given another needle pass on each side (again 300 punches/inch), with increased needle penetration, there is a tendency for tears to develop in the double-needled composite product.

In another satisfactory product, webs of randomly oriented non-woven viscose rayon fibres (50 g/m$^2$) were needle-punched (300 punches/inch) one on each side of a knitted charcoal cloth (171 g/m$^2$) having the following structure:

Courses per three centimetres:
 face 21.5
 back 23.0
Wales per three centimetres:
 face 20.0
 back 17.5

It will be appreciated that the choice of appropriate needling density and needle size will vary to some extent according to the nature of the layers used in any particular case and, especially, on the weight and openness of the charcoal cloth. An appropriate density and needle size for a given set of layers can in general be found by routine testing.

In general, because there is relatively little masking of the activated carbon in the charcoal cloth incorporated in composite materials according to the invention, the materials may offer as much as 10 times more protection than, for example, those produced according to British Patent Specification No. 1 173 142. Moreover, the airpermeability of materials according to the invention may be as much as 5 times higher than materials according to Specification No. 1 173 142. High air permeability is of particular advantage where the material of the invention is to be used in a suit or other protective clothing, so as to allow good cooling of the body by transmission of air and water vapour.

Preferably, the charcoal cloth is a knitted material, although in principle a woven material with a suitably open weave can be used instead. Non-woven charcoal cloth may also be used but, except in the case of heavy felts, will in general be weaker than a knitted or woven material.

When a composite material of the invention is to be used in making protective clothing, an important advantage of the use of knitted charcoal cloth is its extensibility. Preferably, in order to retain the extensibility, carbonisation and activation of the knitted cloth precursor is effected in a batch process such as is described and claimed in British Patent Specifications Nos. 1 505 095 and 1 570 677, in which the cloth material is suspended in a tensionless manner during the carbonisation and activation procedures. Use of the so-called continuous carbonisation/activation process, in which the cloth precursor is pulled through a furnace under tension, (for example, according to the process and apparatus of British Patent Specification No. 1 310 011) would result in a loss of extensibility, which is undesirable where the product is to be used in protective clothing.

The or each textile layer may comprise, for example, non-woven viscose fibres, heterofilament nylon or other fusible fibres such as, for example, polyester, polyamide (for example, nylon), polyethylene or acrylic fibres. A blend of two or more different fibres may be used in order to impart special properties such as, for instance, fire-resistance or liquid-repellent properties. Thus, for example, fibres of polyvinylchloride may be used to impart fire-resistance.

Depending on the nature of the material of the individual layers and on the intended end use of the composite product, the weight of the or each textile layer may lie in the range of from 12.5 to 300 g/m$^2$, preferably from 25 to 250 g/m$^2$, and is more especially about 25 g/m$^2$. In a composite material which incorporates two textile layers, the weight of each layer may be the same or different.

The weight of the charcoal cloth may typically lie in the range of from 80 to 240 g/m$^2$, preferably from 110 to 180 g/m$^2$, and is more especially about 120 g/m$^2$.

In a composite material which incorporates two textile layers, the inner and outer layers of textile material may be the same or different, depending on what properties are required. For example, in one form of composite textile material according to the invention, there may be a layer of knitted charcoal cloth disposed between a layer of viscose interlock and a layer of a non-woven textile material, the whole being needle-punched so that fibres from the non-woven layer are pushed right through to the viscose layer.

As a further possibility, one layer of a composite material according to the invention may comprise a material of the kind sold by the 3M's corporation under the trade name "FILTRETE", that is to say, a material comprising polypropylene fibres with a permanent dipole (or "electret" fibres). Such materials are very efficient filters for particles of sub-micron size. Thus, for example, for use in a surgical or industrial face-mask one supporting textile layer may comprise heat-formable polyester fibres (for instance, 100 g/m$^2$) and the layer on the other side may comprise "FILTRETE" or similar material (also, for instance, 100 g/m$^2$).

Advantageously, in a composite material according to the invention for use as a medical dressing, there is a thick, hydrophilic adsorbent layer on one side of the charcoal cloth (for example, viscose rayon of 250 to 300 g/m$^2$) and a thin hydrophobic layer on the other side (for example, polypropylene fibres of 25 to 50 g/m$^2$).

The invention also provides a process for making a composite material according to the invention, which comprises arranging a layer of a non-woven or open-knitted or open-woven charcoal cloth on a layer of a textile material, and needle-punching fibres of the textile material through the charcoal cloth.

In one form of process, the charcoal cloth is arranged between two layers of textile material, and fibres of at least one of the textile layers are needle-punched through the resulting multi-layered structure.

In the case where one or each of the textile layers comprises heterofilament nylon or other fusible thermoplastic material, and fibres of the or at least one of those layers have been needle-punched through the multi-layered structure, the needle-punched composite material is advantageously subjected to the action of heat. The result is to bond together at least a proportion of the fusible fibres that have been needle-punched through the composite material, thereby strengthening both the composite as a whole and the matrix holding the charcoal cloth.

Fibres such as heterofilament nylon, in which the filaments comprise two materials of different melting points, offer particular advantages. Thus, by correct temperature selection, one of the materials will fuse to provide the bonding action whilst the other material maintains the structure and loft of the textile layer.

Instead of heating the whole composite material, the needle-punched composite material may be passed through calendering rollers having heated projections (for example, spikes) to effect point-sealing of the fusible fibres. This not only provides local strengthening of the material but also adds flexibility.

Advantageously, in a material according to the invention for use in protective suiting material, a layer on one side of the charcoal cloth comprises a fibrous material which can be heat-calendered to reduce its thickness, and a layer on the other side comprises a knitted cotton material to give high flexibility. The product for this purpose is required to be strong and flexible and of relatively low bulk to avoid an undue insulating effect.

In a second important form of multi-layer material according to the invention, there is a protective layer of a liquid-impermeable, vapour-permeable material attached to the charcoal cloth on the side remote from the said needle-punched textile layer. The liquid-impermeable, vapour-permeable layer may be attached to the charcoal cloth by lamination, and preferably comprises a micro-porous material.

The protective layer is substantially impermeable to liquids but will allow the passage of vapours. Thus, for example, such a layer will allow the outward passage of water vapour from perspiration of the wearer of protective clothing made from the composite material (while preventing penetration by liquid water). This property makes the clothing more comfortable to wear than clothing incorporating completely impermeable material.

When the clothing is worn in a noxious atmosphere, harmful vapour passing through the protective layer from the outside is absorbed by the underlying charcoal cloth. Vapour from a noxious liquid agent applied to the outside of the clothing will likewise be absorbed by the charcoal cloth.

Advantageously, the protective layer comprises a polyurethane or polytetrafluoroethylene, but it will be appreciated that other materials having similar properties may also be used.

The textile layer in the second form of multi-layer material according to the invention may be any of those described herein as having fibres capable of being needle-punched through the charcoal cloth and is preferably a non-woven material.

In a third form of multi-layer material according to the invention, the first form hereinbefore described includes a protective layer of a liquid-impermeable, vapour-permeable material as hereinbefore described with reference to the second form of multi-layer material, preferably as an outermost layer.

Multi-layer materials incorporating a protective layer, for example, a microporous layer, of a liquid-impermeable, vapour-permeable material as described herein are especially useful for making protective gloves.

The principal object of the present invention is to provide a composite textile material for use in making protective clothing. According to a modification of the invention, however, with appropriate selection of fibrous materials, there is obtained a composite textile material which can be hot compression-moulded into any desired shape (for example, into the shape of a face mask). In this case, whereas non-woven charcoal cloth is in general not strong enough to be used in making composite textiles for use in clothing, the same restrictions do not apply where the composite product is to be compression-moulded.

It will be appreciated from the foregoing description that the term "textile" as used herein is not intended to denote or be limited to any particular method of manufacture of fibrous sheet material.

The processes described herein for making composite materials according to the invention are given by way of example only, and other suitable processes will be apparent to those skilled in the art.

The following Example illustrates the invention:

EXAMPLE

A knitted charcoal cloth was made by knitting viscose rayon on standard textile machinery and then subjecting the knitted material to carbonisation and activation procedures according to the batch process described in British Patent Specification No. 1 570 677 to produce an activated, knitted charcoal cloth having a heat of wetting of 45 Joules/g (silicone oil, viscosity $2 \times 10^{-3}$ Ns/m$^2$).

The weight of the charcoal cloth was 171 g/m$^2$ and its knitted structure was as follows:
Courses per three centimeters:
 face 21.5
 back 23.0
Wales per three centimeters:
 face 20.0
 back 17.5

The charcoal cloth was arranged between two layers of randomly oriented non-woven viscose rayon fibres (each 50 g/m$^2$) and fibres of each non-woven layer were needle-punched (300 punches/inch) through to the opposite side of the resulting multi-layered structure.

I claim:

1. A composite material comprising a layer of a non-woven or open-knitted or open-woven charcoal cloth supported on a layer of a textile material having fibres needle-punched through the charcoal cloth.

2. A composite material as claimed in claim 1, in which the charcoal cloth is disposed between the said needle-punched textile layer and a further layer of a textile material.

3. A composite material as claimed in claim 2, wherein fibres of the said further textile layer are also needle-punched through the charcoal cloth.

4. A composite material as claimed in claim 2 wherein fibres of the or each needle-punched textile layer are needle-punched so as to extend through the other textile layer.

5. A composite material as claimed claim 2 wherein one of the said textile layers is relatively thick and comprises a hydrophilic, absorbent material and the other layer is relatively thin and comprises a hydrophobic material.

6. A composite material as claimed in claim 1, wherein there is a protective layer of a liquid-impermeable, vapour-permeable material attached to the charcoal cloth on the side remote from the said needle-punched textile layer.

7. A composite material as claimed in claim 6, wherein the liquid-impermeable, vapour-permeable layer comprises a microporous material.

8. A composite material as claimed in claim 6 wherein the liquid-impermeable, vapour-permeable layer is attached to the charcoal cloth by lamination.

9. A composite material as claimed claim 2 which includes a layer of a liquid-impermeable, vapour-permeable material.

10. A composite material as claimed in claim 9, wherein the liquid-impermeable, vapour-permeable layer is an outermost layer of the composite material.

11. A composite material as claimed claim 1, wherein the charcoal cloth is an open-knitted or open-woven material, preferably having a mesh size in the range of from 0.1 to 0.7 mm.

12. A composite material as claimed in claim 1, wherein the weight of the charcoal cloth is in the range of from 80 to 240 g/m$^2$, preferably from 110 to 180 g/m$^2$.

13. A composite material as claimed in claim 1, wherein the or at least one of the said textile layers is a non-woven material.

14. A composite material as claimed in claim 1, wherein the or at least one needle-punched textile layer is a non-woven material.

15. A composite material as claimed in claim 1, which is a single-needled structure.

16. A composite material as claimed in claim 1, wherein the weight of the or at least one of the said textile layers is in the range of from 12.5 to 300 g/m$^2$, preferably from 25 to 250 g/m$^2$.

17. A composite material as claimed in claim 1, wherein the or at least one of the said textile layers comprises a heat-formable material.

18. A composite material as claimed in claim 1, which contains no adhesive material bonding the layers.

19. A process for making a composite material according to claim 1, which comprises arranging a layer of a non-woven or open-knitted or open-woven charcoal cloth on a layer of a textile material, and needle-punching fibres of the textile material through the charcoal cloth.

20. A process as claimed in claim 19, wherein the charcoal cloth is arranged between two layers of textile material, and fibres of at least one of the textile layers are needle-punched through the resulting multi-layered structure.

21. A process as claimed in claim 20, wherein one or each of the textile layers comprises a fusible thermoplastic material and, after the needle-punching of fibres of the or at least one of those layers through the multi-layered structure, the composite material is heated to bond together at least a proportion of the fusible fibres.

22. A process as claimed in claim 20, wherein one or each of the textile layers comprises a fusible thermoplastic material and, after the needle-punching of fibres of the or at least one of those layers through the multi-layered structure, the composite material is passed through calendering rollers having heated projections to effect point-sealing of the fusible fibres.

23. An article of protective clothing, a medical dressing, a filter or a moulded article, comprising a composite material as claimed in claim 1.

* * * * *